United States Patent
Lu et al.

(10) Patent No.: US 7,903,873 B2
(45) Date of Patent: Mar. 8, 2011

(54) TEXTUAL IMAGE CODING

(75) Inventors: Yan Lu, Beijing (CN); Feng Wu, Beijing (CN); Wenpeng Ding, Hefei (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 11/855,075

(22) Filed: Sep. 13, 2007

(65) Prior Publication Data

US 2009/0074307 A1 Mar. 19, 2009

(51) Int. Cl.
*G06K 9/36* (2006.01)
(52) U.S. Cl. .......................... 382/166; 382/232; 382/238
(58) Field of Classification Search .................. 382/232, 382/238, 166, 132; 375/E7.088; 378/20; 235/447, 454; 341/120, 139; 707/999.103; 709/212, 216; 714/E11.181; 715/707, 708; 717/104, 106
See application file for complete search history.

(56) References Cited

U.S. PATENT DOCUMENTS

| | | | |
|---|---|---|---|
| 5,414,527 A | 5/1995 | Koshi et al. | |
| 5,457,776 A * | 10/1995 | Wong et al. ................... | 715/234 |
| 5,973,681 A | 10/1999 | Tanigawa et al. | |
| 6,314,208 B1 | 11/2001 | Konstantinides et al. | |
| 6,426,809 B1 | 7/2002 | Hayashi et al. | |
| 6,449,658 B1 | 9/2002 | Lafe et al. | |
| 6,628,411 B2 | 9/2003 | Miller et al. | |
| 6,701,020 B2 | 3/2004 | Chrysafis et al. | |
| 6,744,919 B2 | 6/2004 | Said | |
| 6,865,298 B2 | 3/2005 | Li | |
| 6,898,313 B2 | 5/2005 | Li | |
| 6,977,738 B2 | 12/2005 | Wood | |
| 7,027,647 B2 | 4/2006 | Mukherjee | |
| 7,139,433 B2 | 11/2006 | Li | |
| 7,145,676 B2 | 12/2006 | Fan | |
| 7,219,328 B2 * | 5/2007 | Schloegel et al. .............. | 717/104 |
| 2004/0042547 A1 | 3/2004 | Coleman | |
| 2005/0135693 A1 | 6/2005 | Ahmed et al. | |

(Continued)

FOREIGN PATENT DOCUMENTS

KR 20060127344 (A) 12/2006

OTHER PUBLICATIONS

Li, et al., "Block-based Segmentation and Adaptive Coding for Visually Lossless Compression of Scanned Documents", available at least as early as Jun. 5, 2007, at <<http://ieeexplore.ieee.org/iel5/7594/20708/00958148.pdf?isNumber=>>, IEEE, 2001, pp. 450-453.

(Continued)

*Primary Examiner* — Anh Hong Do
(74) *Attorney, Agent, or Firm* — Lee & Hayes, PLLC

(57) ABSTRACT

Textual image coding involves coding textual portions of an image. In an example embodiment, a textual block of an image is decomposed into multiple base colors and an index map, with the index map having index values that each reference a base color so as to represent the textual block. A set of neighbor index values are ascertained for a particular index of the index map. A context that matches the neighbor index values is generated from among multiple contexts. The matching context includes a set of symbols. At least one symbol-to-value mapping is determined based on the matching context and a symbol to which the particular index corresponds. The particular index is remapped to a particular value in accordance with the symbol-to-value mapping and the symbol to which the particular index corresponds.

20 Claims, 12 Drawing Sheets

Example Specific
Method for
Textual Image Coding

U.S. PATENT DOCUMENTS

| | | |
|---|---|---|
| 2005/0149865 A1 | 7/2005 | Wang et al. |
| 2005/0191032 A1 | 9/2005 | Seo et al. |
| 2007/0201751 A1 | 8/2007 | Wu et al. |

OTHER PUBLICATIONS

Queiroz, "Compressing compound documents", available at least as early as Jun. 5, 2007, at <<http://image.unb.br/queiroz/papers/doc-compression.pdf>>, pp. 33.

Queiroz, et al., "Optimizing block-threshold segmentation for mrc compression", available at least as early as Jun. 5, 2007, at <<http://image.unb.br/queiroz/papers/icip00mrc.pdf>>, pp. 4.

PCT Search Report and Written Opinion for International Application No. PCT/US2008/076145, mailed on Apr. 10, 2009, 10 pgs.

* cited by examiner

Example Textual Block Decomposition

| | | | | | |
|---|---|---|---|---|---|
| (a) | Four Identical Neighboring Color Indices | ○ —→ 0 ←602 | | | |
| (b) | Three Identical Neighboring Color Indices | ○ —→ 0 | ☐ —→ 1 ←602 | | |
| (c) | Two Pairs of Identical Neighboring Color Indices | ○ —→ 0 | ☐ —→ 1 ←602 | | |
| (d) | Exactly Two Identical Neighboring Color Indices | ○ —→ 0 | ☐ —→ 1 | △ —→ 2 ←602 | |
| (e) | No Identical Neighboring Color Indices | ○ —→ 0 | ☐ —→ 1 | △ —→ 2 | ⬡ —→ 3 ←602 |

Index Mapping by Context Category

FIG. 6

Example
Image Encoder

Example Image Decoder

Example Method for Encoding Textual Blocks

FIG. 11 — Example Method for Decoding Textual Blocks

Example Device for Textual Image Coding

TEXTUAL IMAGE CODING

BACKGROUND

Images today are often stored, manipulated, and transmitted in electronic format. Especially with regard to the storage and transmission of images, the size of the data for an electronic image continues to be important. Generally, the smaller the size of an electronic image, the easier it is to store or transmit. The size of the data for an electronic image may be reduced by compressing the data. Unfortunately, appreciable compression is often lossy, which means that information is lost during a compression and decompression cycle. This lost information results in the visual quality of the image being degraded after the decompression.

In other words, although higher compression facilitates the storage and transmission of an image, such compression usually degrades the resulting visual quality of the electronic image after decompression. Consequently, a balance is typically struck between an implemented compression ratio and good visual quality. One way to improve this balance is to improve the compression algorithm that is applied to the electronic image. If the compression algorithm is improved, a higher compression ratio can be attained without sacrificing visual quality. A novel and superior compression algorithm that is particularly applicable to images having textual portions is described herein below.

SUMMARY

Textual image coding involves coding textual portions of an image, which may have both textual and graphical portions. In an example embodiment, a textual block of an image is decomposed into multiple base colors and an index map, with the index map having index values that each reference a base color so as to represent the textual block. A set of neighbor index values are ascertained for a particular index of the index map. A context that matches the set of neighbor index values is generated from among multiple predetermined contexts. The matching context includes a set of symbols. At least one symbol-to-value mapping is determined based on the matching context and a symbol to which the particular index corresponds, with the symbol-to-value mapping including at least one mapping from a respective symbol to a respective value. The particular index is remapped to a particular value in accordance with the symbol-to-value mapping and the symbol to which the particular index corresponds. After the index map is converted by remapping each index thereof, the converted index map and the base colors may be coded to compress them.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, application programming interface (API), arrangement, etc. implementations are described herein.

BRIEF DESCRIPTION OF THE DRAWINGS

The same numbers are used throughout the drawings to reference like and/or corresponding aspects, features, and components.

FIG. 6 is a tabular diagram that illustrates multiple different index mappings by symbol for the coding of textual blocks with the mappings organized by context category.

DETAILED DESCRIPTION

Introduction to Textual Image Coding

With the rapid development of the Internet and the widespread adoption of rich media applications, compound images are produced in addition to natural images. Compound images may include, but are not limited to, web pages, slides, posters, and so forth. Compound images include textual portions and graphical portions. The textual portions include, for example, alphanumeric or other characters in various fonts that are formed from pixels (e.g., bit-mapped) or are otherwise not currently recognized as being individual whole characters. The graphical portions include, for example, natural pictures.

For natural pictures, many existing image and video coding standards (e.g., JPEG2000 and H.264/AVC) have demonstrated good coding performance. However, they are inadequate at compressing compound images, especially due to any textual portions thereof. In an example embodiment, textual portions and graphical portions of a compound image are distinguished. The textual portions are then coded using an approach that differs from that of the graphical portions.

Figure 1:
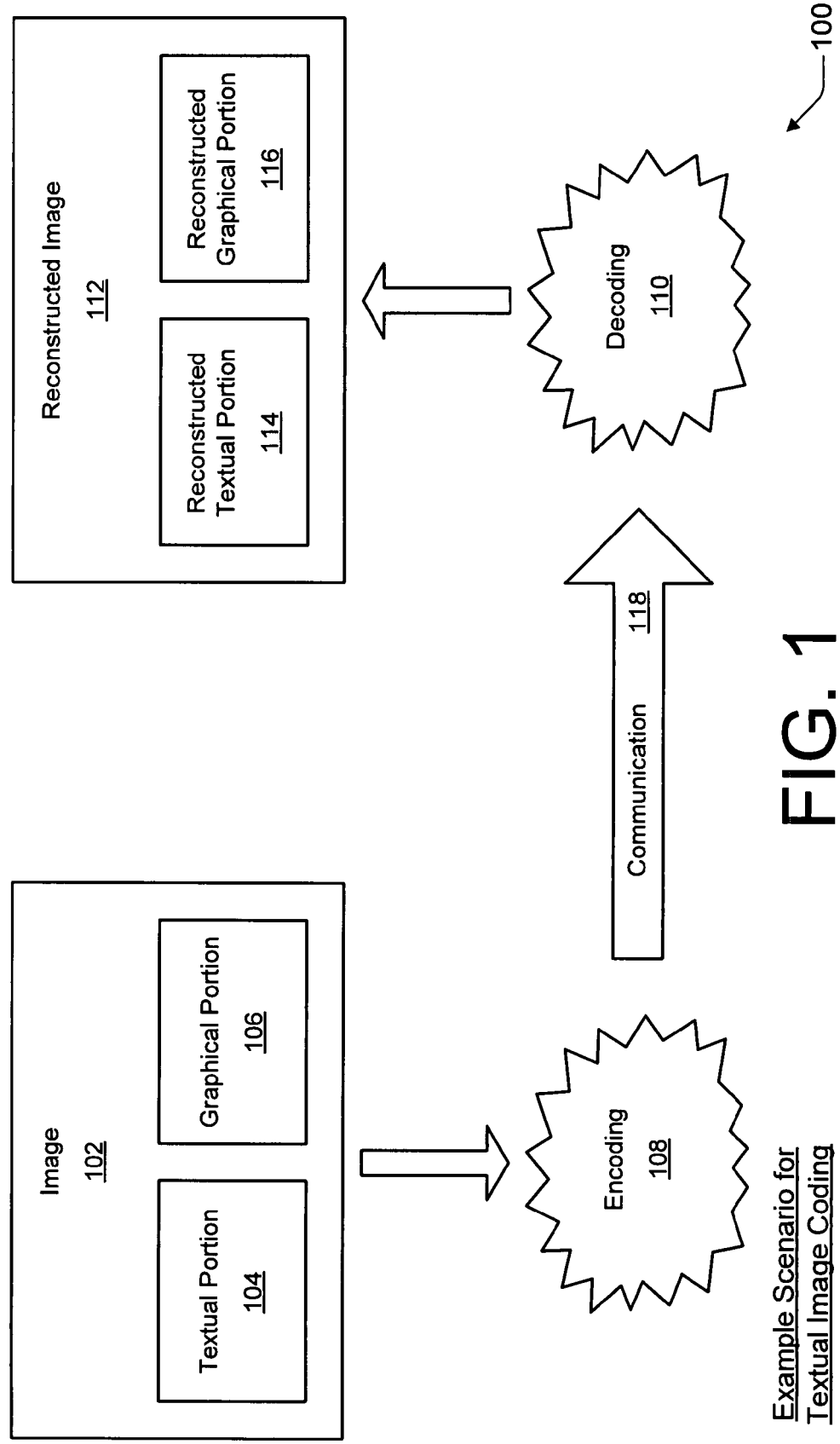
FIG. 1 is a block diagram of an example scenario in which textual image coding may be implemented on an image having a textual portion.

FIG. 1 is a block diagram of an example scenario 100 in which textual image coding may be implemented on an image having a textual portion. As illustrated, scenario 100 includes an image 102 and a reconstructed image 112. Image 102 includes at least one textual portion 104 and at least one graphical portion 106. Reconstructed image 112 includes at least one reconstructed textual portion 114 and at least one reconstructed graphical portion 116. Scenario 100 also includes an encoding procedure 108, a decoding procedure 110, and a communication procedure 118.

For an example embodiment, image 102 is encoded by encoding procedure 108. Textual portion 104 is encoded using a first encoding approach, and graphical portion 106 is encoded using a second, different encoding approach. A compressed version of image 102 is then communicated from one device to another device and/or from one memory to another memory via communication procedure 118. An example device that may be used to implement embodiments for textual image coding is described herein below with particular reference to FIG. 12.

After communication procedure 118, decoding procedure 110 is applied to the compressed version of image 102 to produce a decompressed version, which is termed the reconstructed image 112. A first decoding approach is applied to the compressed version of textual portion 104 to produce reconstructed textual portion 114. A second decoding approach is applied to the compressed version of graphical portion 106 to produce reconstructed graphical portion 116. Although images 102/112 include both textual portions 104/114 and graphical portions 106/116, the inventive principles as described herein are also applicable to images 102/112 that include only textual portion(s) 104/114.

Example Embodiments for Textual Image Coding

Figure 2:
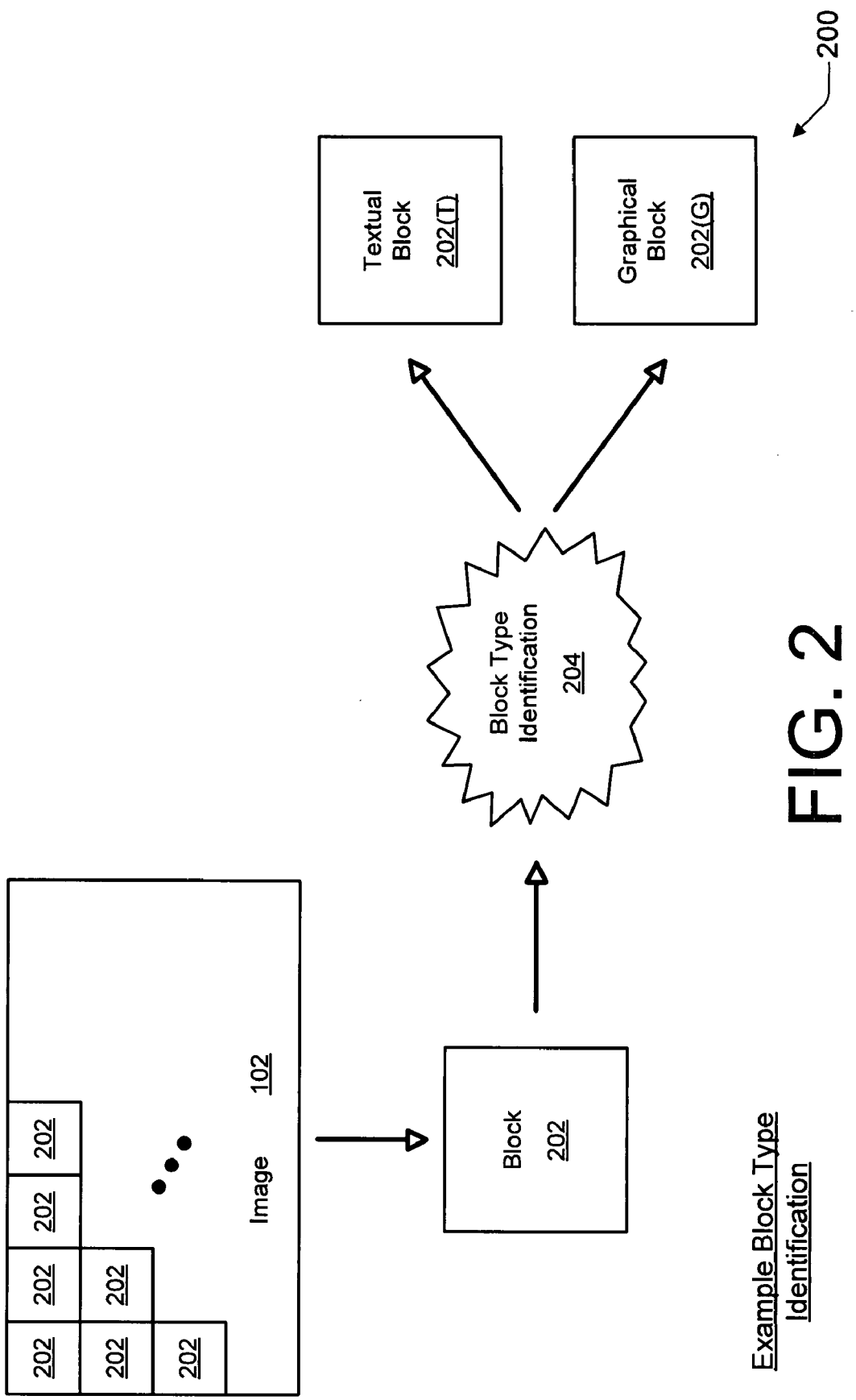
FIG. 2 is a block diagram of an example identification procedure for distinguishing blocks of an image as being textual blocks or graphical blocks.

FIG. 2 is a block diagram of an example identification approach 200 for distinguishing blocks of an image 102 as being textual blocks 202(T) or graphical blocks 202(G). Hence, a block-based approach is employed in this example. As illustrated, identification approach 200 includes image 102, blocks 202, and a block type identification procedure 204.

For an example embodiment, image 102 is divided into and thus includes multiple blocks 202. These blocks 202 may be of any size, shape, or proportion. However, an example value for such blocks is 16 pixels by 16 pixels. Block type identification procedure 204 is applied to each block 202. Each block 202 is thereby distinguished as being a textual block 202(T) or a graphical block 202(G).

Any technique may be used to identify blocks as textual portions or graphical portions. By way of example only, the techniques described in co-pending U.S. Nonprovisional patent application Ser. No. 11/276,342 entitled "Block-Based Fast Image Compression", which was filed 24 Feb. 2006, by inventors Feng Wu et al. and assigned to the same Assignee (MICROSOFT® Corp.) may be employed to implement a block-type identification. Although blocks 202 are distinguished as being of one of two image portion types, there may alternatively be more than two possible types of image blocks. Similarly, graphical blocks 202(G) may be subdivided into different types of graphical blocks (e.g., smooth, hybrid, etc.). Each respective image block type may be encoded using its own respective algorithm type. It should be understood that for images that are known to have only textual portions, the block type identification procedure 204 may be omitted.

Figure 3:
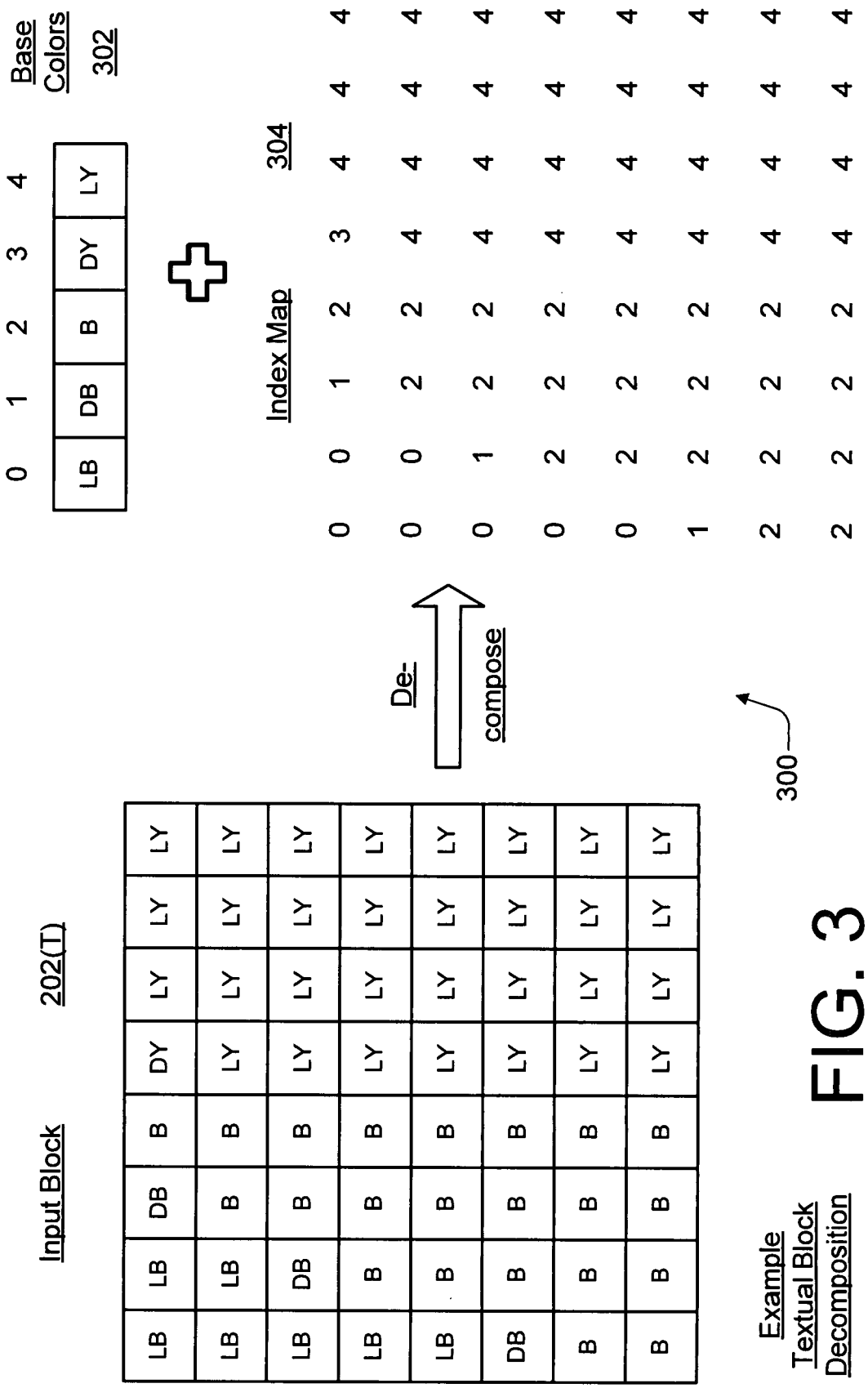
FIG. 3 is a block diagram of an example textual block decomposition into base colors and an index map.

FIG. 3 is a block diagram of an example textual block decomposition procedure 300 that decomposes a block into base colors 302 and an index map 304. As illustrated, textual input block 202(T) is decomposed 300 into one or more base colors 302 and at least one index map 304. In this example, input block 202(T) is formed from a portion of an image that is eight pixels by eight pixels. However, input block 202(T) may be of a different size or proportion (e.g., it need not be square).

Generally, input block 202(T) represents pixels that form at least part of one or more characters of a textual portion of an image. Each pixel color of input block 202(T) is represented by one or two letters as follows: LB=light blue, DB=dark blue, B=black, DY=dark yellow, and LY=light yellow. Thus, the top row includes eight pixels that are, from left to right, as follows: light blue, light blue, dark blue, black, dark yellow, light yellow, light yellow, and light yellow.

In an example embodiment, input block 202(T) is decomposed 300 into base colors 302 and an index map 304. Base colors 302 are colors that are extracted from input block 202(T). Each color of base colors 302 is associated with a value, such as a numerical value. In the illustrated example, light blue is associated with 0, dark blue is associated with 1, black is associated with 2, dark yellow is associated with 3, and light yellow is associated with 4. The pixel colors of input block 202(T) are represented by index map 304 as a matrix having the numerical values that are associated therewith by base colors 302.

Index map 304 represents the structural information contained in the pixels of input block 202(T). Index map 304 therefore has the same dimension as input block 202(T), which is eight by eight in this example. The top row of index map 304 includes eight index values that are, from left to right, as follows: 0, 0, 1, 2, 3, 4, 4, and 4. In an example embodiment, base colors 302 and index map 304 are separately coded. To enable a more efficient coding and a likely higher compression ratio, index map 304 is coded by remapping the index values based on multiple contexts using a structure-aware paradigm. Example contexts and methods for this remapping are described further herein below, especially with reference to FIGS. 5, 6, et seq.

Next, an example embodiment of a scheme for textual image coding is described generally. As illustrated in FIG. 3, textual blocks are represented in the spatial domain using multiple base colors and an index map. The index map indicates the structural information of a textual block. To decompose a textual block, a color quantization algorithm is applied to generate this representation, which is followed by a structure-aware context-adaptive arithmetic encoding.

With regard to color quantization generally, traditional color quantization methods such as vector quantization and K-means are designed to minimize the distortion for the display of a limited number of colors. However, the entropy of the color-quantized image may be high, which makes it difficult to compress. In an example described approach, the number of bits for compression is also considered during color quantization. Because base colors cost far fewer bits than the index map, the entropy of a textual block usually depends primarily on the index map. To reduce the entropy, the diversity and disorder of the index map is constrained. To do so, a two-step quantization process is used to achieve the rate and distortion trade-off.

As a first step, a local quantization is performed to cluster neighboring similar pixels into a group. This ensures, or at least increases the likelihood, that neighboring pixels will tend to be quantized to the same base color. As a result, the disorder of the associated index map is reduced. In particular, given an allowed maximum distortion among neighboring pixels, each neighboring pixel with distance under a threshold are clustered to the same group, which is represented by their average value.

As a second step, the block after local quantization is further quantized to multiple base colors. Specifically, the pixels in the same group are quantized to the same color. The total number of base colors of a given block depends on the content. Instead of quantizing each block to a fixed number of colors, the allowed maximum distortion is set to be a constant. By way of example only, the constant may be equal to $q^2/4$, where q is the quantization step used in an H.264/Advanced Video Coding (H.264/AVC) (aka MPEG-4 Part 10) intra coding. With this example, the number of base colors of a 16×16 macroblock may vary from 1 to 8. In practice, a tree structure vector quantization (TSVQ) method may be employed in which each pixel is treated as a vector. With a TSVQ method, the maximum distortion may be the criterion to split a tree in TSVQ.

In an example embodiment, with regard to the entropy coding for a textual block, both the base colors and the index map may be compressed with a context-adaptive arithmetic coder. The YUV components of a base color are first quantized. Index maps show similar patterns among many different textual blocks. Predetermined contexts and predefined remappings are used to exploit the similar patterns to enhance the compression.

When coding an index map, the indices are arranged in scan line order. The predetermined context that matches an index to be coded is deduced from its neighboring index values. The current index value is then remapped to a symbol according to its matched context and neighboring indices, and the symbol is coded with an arithmetic coder using the context. Example predetermined contexts are described herein below with particular reference to FIG. 5, and example predefined mappings are described herein below with particular reference to FIG. 6.

Figure 4:
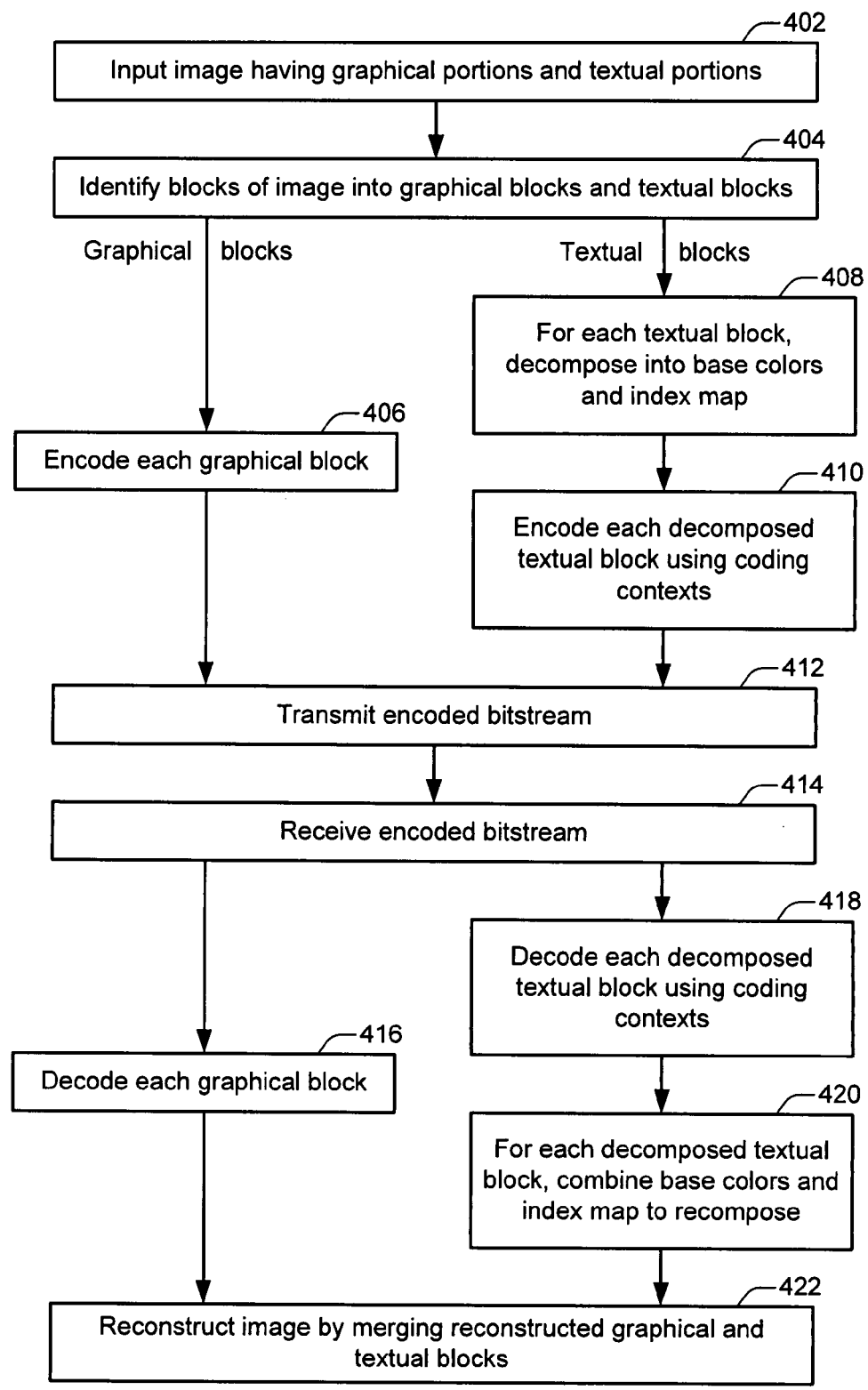
FIG. 4 is a flow diagram that illustrates an example of a method for image coding of graphical blocks and textual blocks that includes encoding and decoding.

FIG. 4 is a flow diagram 400 that illustrates an example of a general method for image coding involving graphical blocks and textual blocks. The image coding includes both encoding and decoding. Flow diagram 400 includes eleven (11) blocks 402-422. At block 402, an image having graphical portions and textual portions is accepted as input. At block 404, blocks of the image are identified as being graphical blocks or textual blocks. The left side of flow diagram 400 (e.g., blocks 406 and 416) pertain to graphical blocks. The right side of flow diagram 400 (e.g., blocks 408, 410, 418, and 420) pertain to textual blocks.

At block 406, each graphical block is encoded. At block 408, each textual block is decomposed into one or more base colors and an index map. At block 410, each decomposed textual block is encoded using coding contexts and remappings. Example structural-aware coding contexts are described herein below with particular reference to FIG. 5. Example predefined mappings are described herein below with particular reference to FIG. 6. At block 412, an encoded bitstream having compressed graphical blocks and compressed textual blocks is transmitted from a first device and/or memory.

At block 414, the encoded bitstream is received at a second device and/or memory. At block 416, the compressed graphical blocks are decoded to produce reconstructed graphical blocks. Each decomposed textual block that was received in a compressed form is decoded at block 418 using the remappings and the coding contexts. At block 420, each decomposed textual block that has been decoded is recomposed by combining the decoded base colors and the decoded index map into a reconstructed textual block. A version of the original image is reconstructed at block 422 by merging the decoded and reconstructed graphical blocks with the decoded and reconstructed textual blocks. After all or part of the image has been reconstructed, it may be presented on a display device, including a screen, printer, and so forth.

Figure 5:
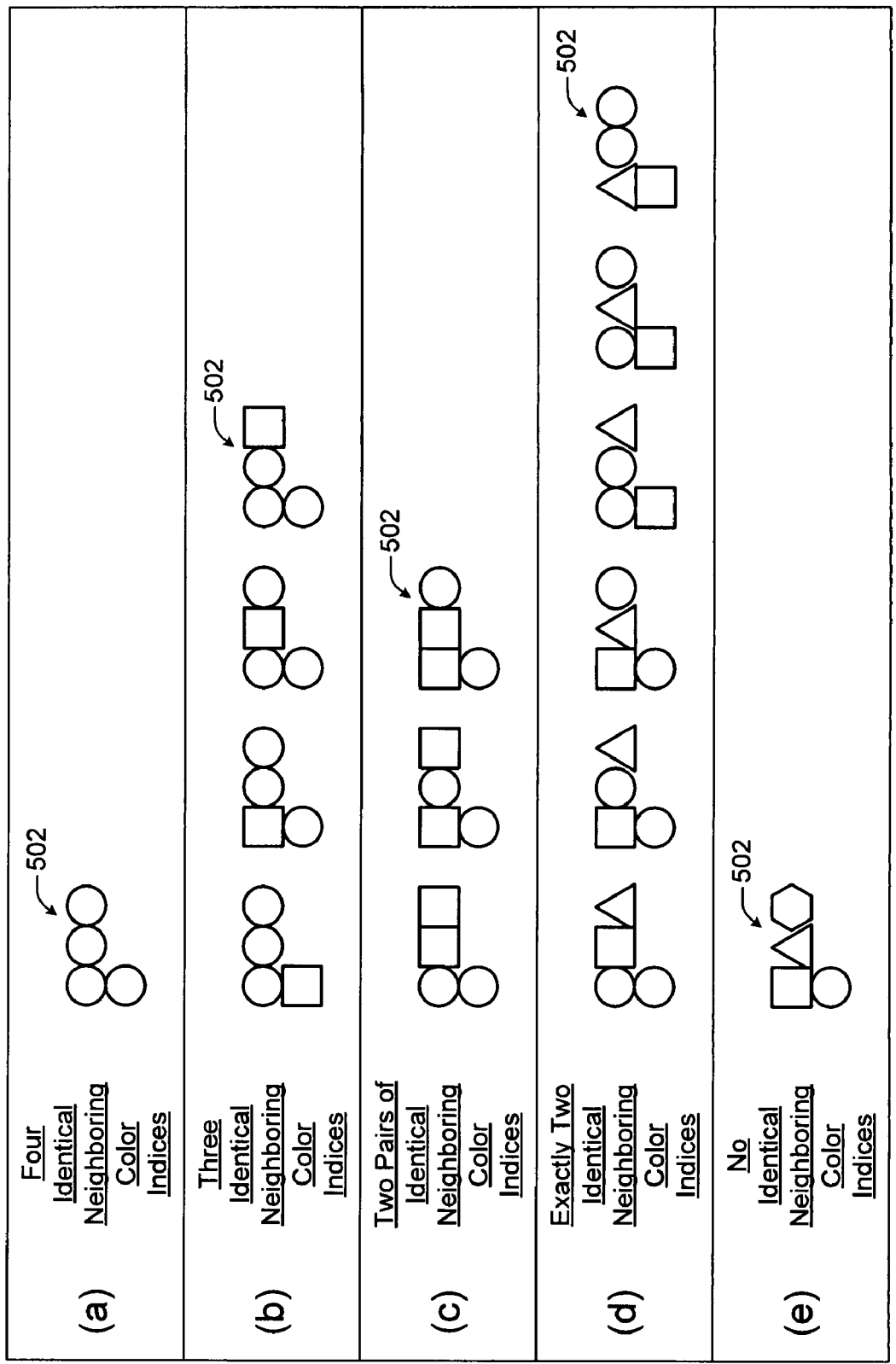
FIG. 5 is a tabular diagram that illustrates multiple different example contexts for index map coding of textual blocks that are organized by context category.

FIG. 5 is a tabular diagram 500 that illustrates multiple different example contexts 502 for index map coding that are organized by context category. As illustrated, tabular diagram 500 includes fifteen (15) predetermined contexts 502 divided into five (5) context categories (a)-(e). The 15 contexts are defined according to proximate neighbor indices (or pixels). Generally, four adjacent neighboring indices define each context.

There are up to four different possible symbols or shapes for each context. Each shape represents a neighboring index, while the different shapes indicate the different potential index values. By way of example only, the illustrated symbol shapes (or more generally symbol types) are: a circle, a square, a triangle, and a hexagon. The neighboring indices corresponding to symbols may be considered proximate when they are sufficiently close to a particular index so as to act as probabilistic predictors of the color/symbol of the particular index.

In an example embodiment, the four proximate neighboring indices are adjacent. These four adjacent neighboring indices include two that are along the cardinal directions (e.g., left, right, top, or bottom) and two that are along the diagonal directions (e.g., left-top, right-top, left-bottom, or right-bottom). A different number of neighboring indices other than four may alternatively be used for the contexts. More specifically, the four adjacent neighboring indices as illustrated include a left index, a left-top index, a top index, and a right-top index.

The definitions of left, right, top, and bottom are with respect to the scan line pattern and not necessarily with respect to the texture of the image (although they can be so defined). In other words, the first line of a block being scanned for coding and the direction of such scanning determine the top of the block and the left-right (or right-left) pattern, respectively. In other words, the selection of (e.g., four) neighboring indices for the contexts may be based on which neighboring indices are known when a particular index is being mapped in dependence on the scan line pattern.

The contexts 502 of any given category (a)-(e) each have the same number of different color indices as established by the neighboring indices of a current index being remapped. The single context 502 of context category (a) has four identical neighboring color indices. The contexts 502 of context category (b) have exactly three identical neighboring color indices. Context category (b) includes four different contexts 502 to represent the four possible positional permutations of four indices in which one and only one index differs from the other three.

The contexts 502 of context category (c) have two pairs of identical neighboring color indices. Context category (c) includes three different contexts. The contexts 502 of context category (d) have exactly two identical neighboring color indices. Context category (d) includes six different contexts to represent the six possible positional permutations of four indices in which two are different from each other as well as from the two identical indices. The single context 502 of context category (e) has no identical (i.e., four different) neighboring color indices.

Generally, those index values of an index map that are represented by one of the symbols (e.g., circle, square, triangle, or hexagon) are remapped. This remapping is performed because, in the same structure-aware context, the probability distributions of indices correlate to the actual values of neighboring indices. Generally, index values of neighboring pixels have higher probabilities than other values to occur in a current particular index being remapped.

The indices with high probabilities are remapped to small values. Taking a context 502 of context category (b) as an example, the index value corresponding to the circle symbol has the highest probability of occurrence. Hence, this index value is remapped to 0, which makes the compression of the current index ultimately more efficient when taken with the textual block as a whole. The predetermined contexts 502 of tabular diagram 500 are defined such that the base color value having the greatest probability of being the current index, based on its structure-aware context, is remapped to zero using the symbols (e.g., the circle symbol). Example predefined context mappings for each of the context categories is described below with particular reference to FIG. 6.

The contexts 502 of tabular diagram 500 are primarily applicable to interior indices. More specifically, they are not applicable to the top row or to the outside columns (e.g., the far left and far right columns). However, other contexts may be applied to the boundary indices whose neighboring indices are at least partially unavailable. These (e.g., twenty-two) other contexts may be used to similarly code the boundary indices.

FIG. 6 is a tabular diagram 600 that illustrates multiple different index mappings 602 by symbol with the mappings organized by context category. The five (5) context categories (a)-(e) of tabular diagram 600 correspond respectively to the five context categories (a)-(e) of tabular diagram 500 (of FIG. 5). Each context category includes at least one index mapping 602 that maps a given symbol to its associated index value. These symbol-to-index value mappings are used to remap current indices based on a predetermined context 502 that matches the current index.

In an example embodiment, the contexts 502 of tabular diagram 500 are carefully arranged such that the same symbol for any of the five context categories (a)-(e) maps to the same index value. (However, the symbols of each context 502 may be arranged differently.) As is evident from tabular diagram 600, the circular symbol maps to the index value=0 for each of the context categories (a)-(e). When present, the square symbol maps to the index value=1 for each of the context categories (b)-(d). Similarly, the triangle symbol maps to index value=2 for each of the context categories (d) and (e), and the hexagon maps to index value=3 for the context category (e).

Figure 7:
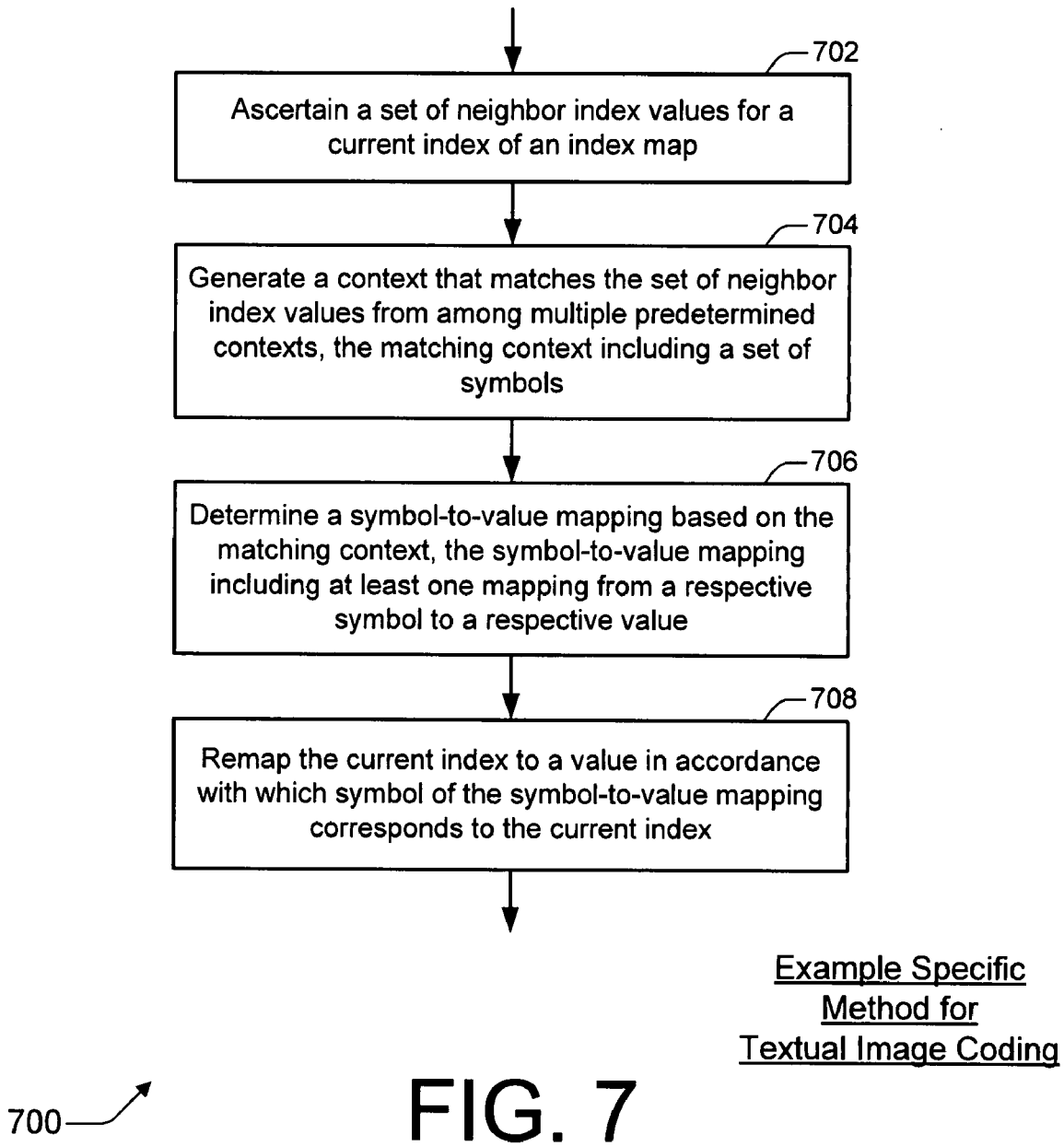
FIG. 7 is a flow diagram that illustrates an example of a method for textual image coding using the contexts and the symbol mappings of FIGS. 5 and 6, respectively.

FIG. 7 is a flow diagram 700 that illustrates an example of a method for textual image coding using predetermined contexts 502 and predefined symbol mappings 602 of FIGS. 5 and 6, respectively. Flow diagram 700 includes four (4) blocks 702-708. At block 702, a set of neighbor index values for a current index of an index map is ascertained. For example, four neighboring index values that are adjacent to the current index and that are located at the left, top-left, top, and top-right positions may be ascertained from an index map 304.

At block 704, a context that matches the set of neighbor index values is generated from among multiple predetermined contexts, the matching context including a set of symbols. For example, if there are three identical neighboring color indices, a predetermined context 502 (of FIG. 5) having four symbols, three of which are identical, may be generated from the context category (b) to match the ascertained set of neighbor indices. To further illuminate certain principles of a described embodiment, a specific pixel color example is provided. It is assumed for this example that the neighboring indices for the current index are dark blue for the left index, black for the top-left index, dark blue for the top index, and dark blue for the top-right index. This corresponds to the second from left context 502 in context category (b). The circle symbol therefore corresponds to the dark blue pixel color, and the square symbol therefore corresponds to the black pixel color.

At block 706, a symbol-to-value mapping based on the matching context is determined, the symbol-to-value mapping including at least one mapping from a respective symbol to a respective value. For example, the index mappings 602 (of FIG. 6) of the context category (b) are referenced. Circle symbols are mapped to zero for a dark blue pixel color, and the square symbol is mapped to 1 for a black pixel color.

At block 708, the current index is remapped to a value in accordance with which symbol of the symbol-to-value mapping corresponds to the current index. For example, if the current index is dark blue and thus corresponds to a circle symbol, then the current index is remapped to a zero value using the index mappings 602. If the current index is black and thus corresponds to a square symbol, then the current index is remapped to a 1 value. If the current index does not match one of those in the set of neighbor index values (i.e., if the color of the current index is neither dark blue nor black), the value of the current index is unchanged by the remapping.

Figure 8:
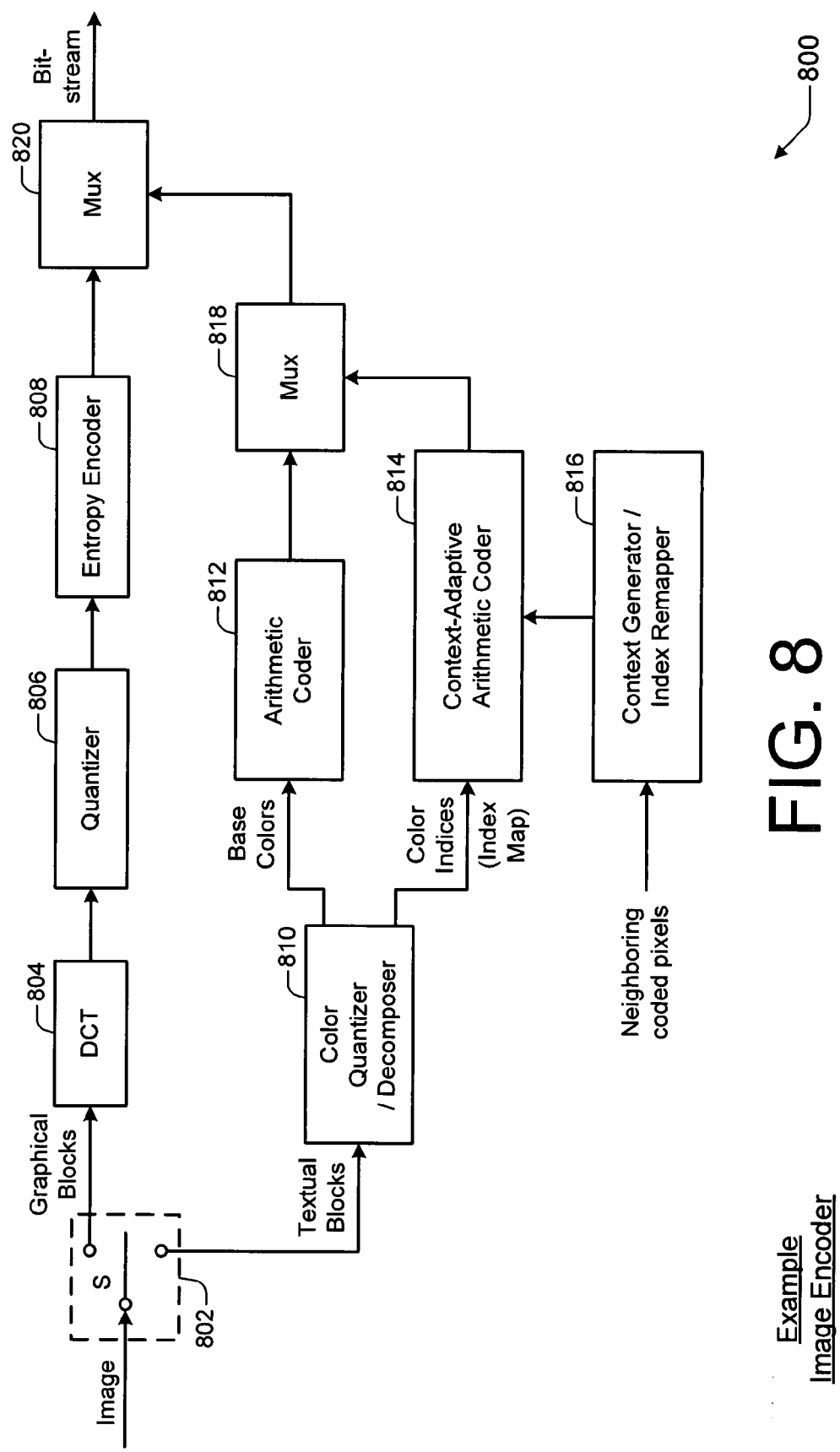
FIG. 8 is a block diagram of an example image encoder that may implement textual image encoding.

FIG. 8 is a block diagram of an example image encoder 800 that may implement textual image encoding. Image encoder 800 may be embodied as software, firmware, hardware, fixed logic circuitry, some combination thereof, and so forth. An image is input on the left at block identification switch 802, and a compressed image bit stream is output from multiplexer 820 on the right (e.g., and communicated to image decoder 900 of FIG. 9). By way of example only, image encoder 800 may implement an encoding side of a modified H.264/AVC intra coding scheme. The H.264/AVC intra coding scheme is modified such that textual blocks are identified and encoded using structure-aware contexts and index mappings as described herein.

As illustrated, image decoder 800 generally includes graphical-oriented components 804-808 and textual-oriented components 810-818. More specifically, image encoder 800 includes block identification switch 802, a discrete cosine transformer (DCT) 804, a quantizer 806, an entropy encoder 808, and multiplexer 820. Image encoder 800 also includes a color quantizer 810, an arithmetic coder 812, a context-adaptive arithmetic coder 814, a context generator/index remapper 816, and a multiplexer 818.

In operation for an example embodiment, an image is input to block identification switch 802. Block identification switch 802 distinguishes between graphical blocks and textual blocks. Graphical blocks are forwarded to DCT 804, and textual blocks are forwarded to color quantizer 810. DCT 804, quantizer 806, and entropy encoder 808 may function in manners known in the art (e.g., in accordance with H.264/AVC) to encode a graphical block. For example, DCT 804 may apply a discrete cosine transform to the graphical blocks. The DCT coefficients are quantized by quantizer 806, and the quantized DCT coefficients are encoded by entropy encoder 808. Other, non-entropy encoding may alternatively be used. Entropy encoder 808 outputs a compressed graphical bit stream.

Color quantizer/decomposer 810 accepts as input the textual blocks from block identification switch 802. Color quantizer 810 performs one or both of the steps described herein above for the two-step quantization process. Namely, color quantizer 810 performs a local quantization to group neighboring pixels. Color quantizer 810 further quantizes the colors of the grouped pixels into base colors. Afterwards, color quantizer/decomposer 810 decomposes the color-qunatized textual block into base colors and an index map. Color quantizer 810 outputs the base colors and the color indices as the index map.

Arithmetic coder 812 accepts the base colors as input from color quantizer 810 and codes them to compress their data size. Other, non-arithmetic coding schemes may alternatively be employed. Arithmetic coder 812 outputs the compressed base colors as a bit stream and forwards them to multiplexer 818.

Context-adaptive arithmetic coder 814 accepts as input the index map having the color indices from color quantizer 810. Before context-adaptive arithmetic coder 814 encodes the index map, the color indices thereof are remapped by context generator/index remapper 816. Context generator/index remapper 816 has access to neighboring coded pixels. For instance, the neighboring coded pixels may be ascertained directly by context generator/index remapper 816. Alternatively, the neighboring coded pixels may be ascertained by another component (e.g., color quantizer 810 and/or context-adaptive arithmetic coder 814, etc.) and provided to context generator/index remapper 816.

With reference to tabular diagram 500 (of FIG. 5), the context generator of context generator/index remapper 816 generates a context 502 that matches the ascertained neighboring pixels. The generated context 502 includes one or more symbols and belongs to an associated context category (a)-(e). With reference to tabular diagram 600 (of FIG. 6), an index mapping 602 that is associated with the same context category is determined. The index remapper of context generator/index remapper 816 then remaps each particular pixel of the index map using the determined index mapping 602 in accordance with the symbol to which the particular pixel corresponds.

After each of the indexed pixels of the index map is remapped, context-adaptive arithmetic coder 814 encodes the remapped index map using an arithmetic coding scheme. Alternatively, a non-arithmetic context-adaptive coder may be employed. The coded base colors are provided to multiplexer 818 from arithmetic coder 812, and the coded (and remapped) index map is provided to multiplexer 818 from context-adaptive arithmetic coder 814. Multiplexer 818 combines the coded base colors and the coded index map into a compressed textual bit stream.

Multiplexer 820 receives the compressed graphical bit stream from entropy encoder 808 and the compressed textual bit stream from multiplexer 818. Multiplexer 820 combines the compressed bit streams and forwards the combined compressed bit stream to a memory for storage, to a network for transmission, and so forth. Alternatively, the compressed graphical and textual bit streams may be communicated separately.

Figure 9:
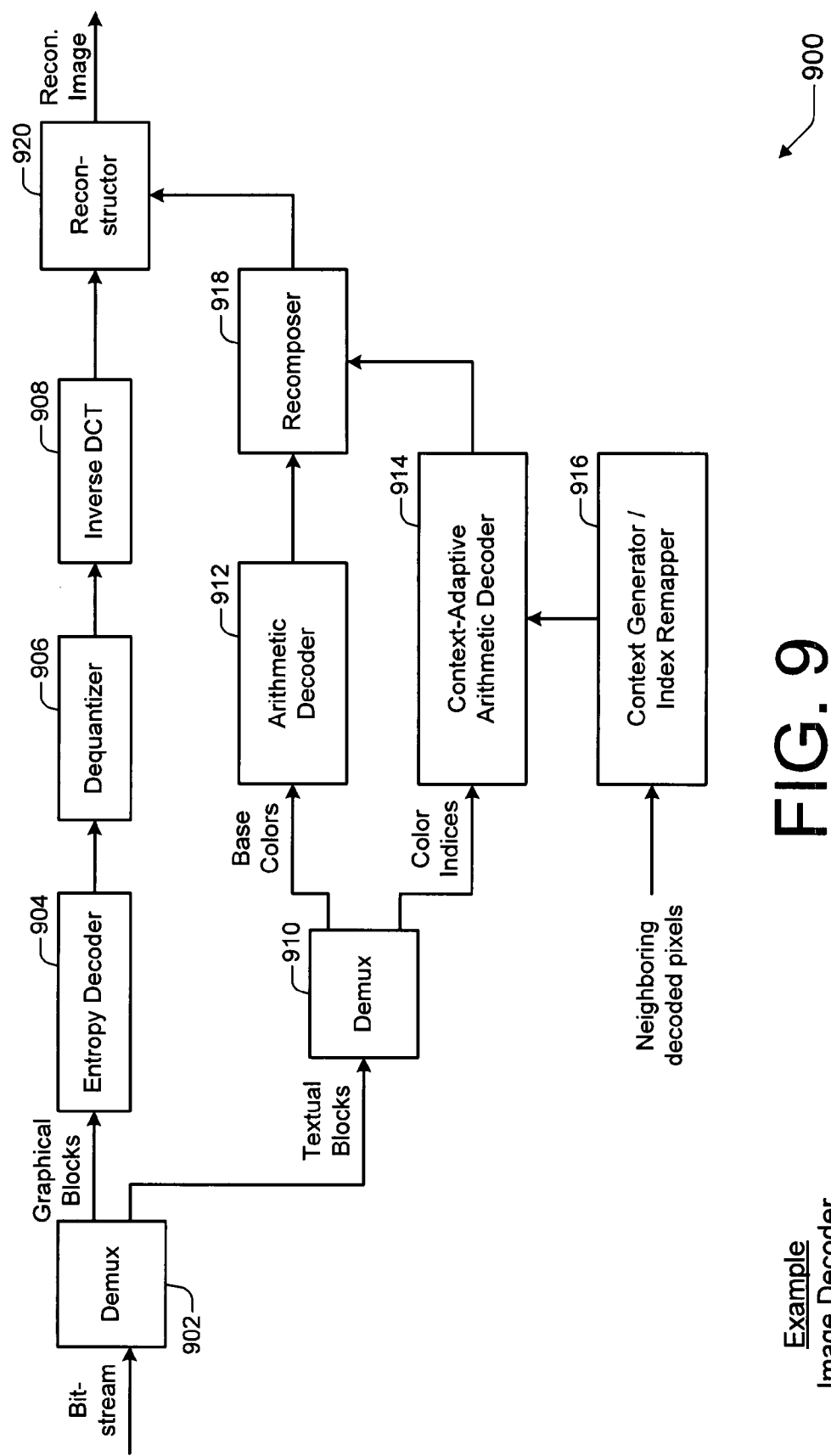
FIG. 9 is a block diagram of an example image decoder that may implement textual image decoding.

FIG. 9 is a block diagram of an example image decoder 900 that may implement textual image decoding. Image decoder 900 may be embodied as software, firmware, hardware, fixed logic circuitry, some combination thereof, and so forth. Generally, a compressed image bit stream is input on the left (e.g., from image encoder 800 of FIG. 8) at demultiplexer 902, and a reconstructed image is output from reconstructor 920 on the right. By way of example only, image decoder 900 may implement a decoding side of a modified H.264/AVC intra coding scheme. The H.264/AVC intra coding scheme is modified such that textual blocks are identified and decoded apart from the graphical blocks. The textual blocks are decoded using structure-aware contexts and index mappings as described herein.

As illustrated, image decoder 900 includes a demultiplexer 902 and an image reconstructor 920. Generally, image decoder 900 includes graphical-oriented components 904-908 and textual-oriented components 910-918. Graphical-oriented components include an entropy decoder 904, a dequantizer 906, and an inverse DCT 908. Textual-oriented components include a demultiplexer 910, an arithmetic decoder 912, a context-adaptive arithmetic decoder 914, a context generator/index remapper 916, and a recomposer 918.

In operation for an example embodiment, a combined compressed bit stream is input to demultiplexer 902. Demultiplexer 902 distinguishes between the compressed graphical bit stream having graphical blocks and the compressed textual bit stream having textual blocks. Graphical blocks of the graphical bit stream are forwarded to entropy decoder 904, and textual blocks of the textual bit stream are forwarded to demultiplexer 910.

Entropy decoder 904, dequantizer 906, and inverse DCT 908 may function in manners known in the art (e.g., in accordance with H.264/AVC) to decode a graphical block from a graphical bit stream. For example, the compressed graphical bit stream may be decoded by entropy decoder 904. Other, non-entropy decoding may alternatively be used. The decoded graphical bit stream is dequantized by dequantizer 906, and the dequantized graphical data is converted back to the spatial domain with inverse DCT 908 to produce the decoded graphical blocks. The decoded graphical blocks are forwarded to reconstructor 920.

Demultiplexer 910 accepts as input the compressed textual bit stream having textual blocks from demultiplexer 902. Demultiplexer 910 separates the base colors from the color indices of the index map and outputs them separately. The base colors are forwarded to arithmetic decoder 912. Arithmetic decoder 912 decodes the base colors. Another, non-arithmetic decoding scheme may alternatively be employed. The decoded base colors are forwarded to recomposer 918.

Context generator/index remapper 916 has access to neighboring decoded pixels of a particular pixel. These neighboring decoded pixels may be directly ascertained by context generator/index remapper 916, or they may be ascertained by one or more other components (e.g., demultiplexer 910, context-adaptive arithmetic decoder 914, etc.) and provided to context generator/index remapper 916. The context generator of context generator/index remapper 916 generates a context that matches the neighboring decoded pixels from among multiple predetermined contexts 502. The generated context, as shown in tabular diagram 500 (of FIG. 5), is a set of symbols.

The index remapper of context generator/index remapper 916 determines a symbol-to-value mapping 602 based on the generated context using tabular diagram 600 (of FIG. 6). The symbol-to-value mapping includes at least one mapping from a respective symbol to a respective value. The index remapper also remaps the particular pixel to a particular value in accordance with which symbol of the symbol-to-value mapping corresponds to the particular pixel. Context generator/index remapper 916 then outputs the particular value for the particular pixel. This is repeated for each pixel of the index map.

Context-adaptive arithmetic decoder 914 accepts the multiple color indices from demultiplexer 910 and each remapped value for each particular pixel from context generator/index remapper 916. Context-adaptive arithmetic decoder 914 decodes the index map using the multiple color indices and the particular value for the particular pixel. For example, context-adaptive arithmetic decoder 914 may decode the compressed index map pixel by pixel, in conjunction with the decompressed index map being remapped by context generator/index remapper 916. Another, non-arithmetic decoding scheme may alternatively be employed. It should be understood that after an index is decompressed with an appropriate decoding scheme by context-adaptive arithmetic decoder 914, the decompressed index is remapped by the index remapper of context generator/index remapper 916. The remapped index is then used to decompress another (e.g., the next) index because the decompression of a current index involves using decoded neighbor indices. Context-adaptive arithmetic decoder 914 forwards the decoded index map to recomposer 918.

Recomposer 918 accepts the decoded base colors from arithmetic decoder 912 and the decoded index map from context-adaptive arithmetic decoder 914 and combines them to recompose the textual block. Recomposer 918 forwards the recomposed textual block to reconstructor 920. Reconstructor 920 therefore receives the decoded graphical blocks from inverse DCT 908 and the decoded textual blocks from recomposer 918. Reconstructor 920 reconstructs the image by combining the graphical blocks and the textual blocks.

Figure 10:
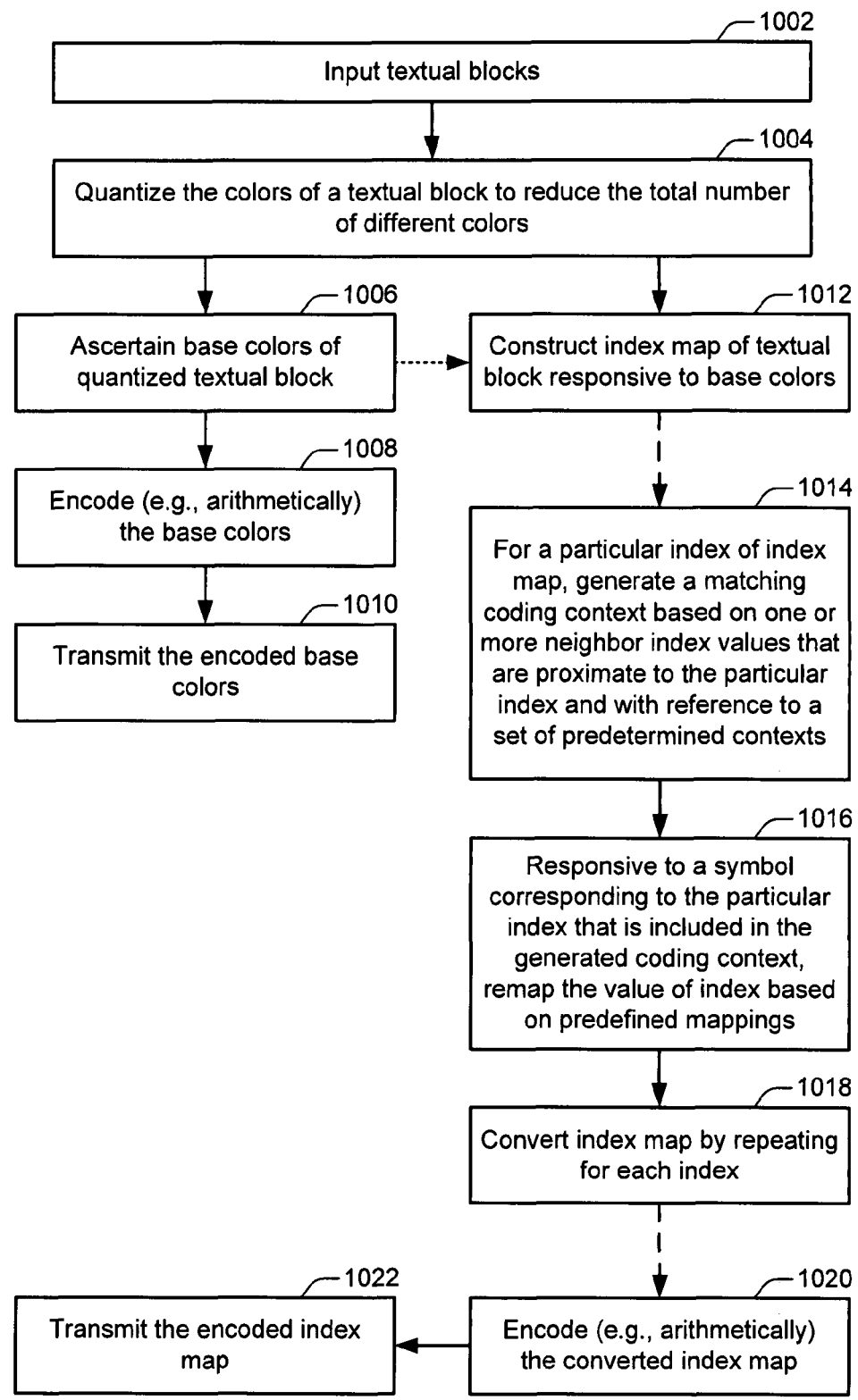
FIG. 10 is a flow diagram that illustrates an example of a method for the encoding of textual blocks.

FIG. 10 is a flow diagram that illustrates an example of a method for the encoding of textual blocks. Flow diagram 1000 includes eleven (11) blocks 1002-1022. At block 1002, textual blocks are input to an encoding process. At block 1004, the colors of a textual block are quantized to reduce the total number of different colors contained in the textual block. For example, one or both steps of the two step quantization process described above may be applied to the textual block.

Blocks 1006 and 1012 serve to decompose the textual block. At block 1006, the base colors of the quantized textual block are ascertained. At block 1012, an index map of the textual block is constructed responsive to the ascertained base colors. Blocks 1008 and 1010 pertain to the base colors. At block 1008, the base colors are encoded (e.g., arithmetically). At block 1010, the encoded base colors of the textual block are communicated (e.g., transmitted).

Blocks 1014-1018 pertain to the coding, including the remapping, of the indices of the index map. At block 1014, for a particular index of the index map, a matching coding context is generated based on one or more neighbor index values that are proximate to the particular index and with reference to a set of predetermined contexts (e.g., of tabular diagram 500 of FIG. 5).

At block 1016, responsive to a symbol that corresponds to the particular index and that is included in the generated coding context, the value of the particular index is remapped based on predefined mappings (e.g., of tabular diagram 600 of FIG. 6). If the predefined mappings vary by context category, then the remapping of the particular index may be performed responsive to a context category that is associated with the generated coding context corresponding to the particular index, with the context category including one or more index mappings. Each index mapping maps a symbol to a value, with the particular index corresponding to one of the symbols. At block 1018, the acts of blocks 1014 and 1016 are repeated for each index of the index map to convert the index map into a remapped index map.

At block 1020, the converted index map is encoded (e.g., arithmetically). At block 1022, the encoded index map for the textual block is communicated (e.g., transmitted).

Figure 11:
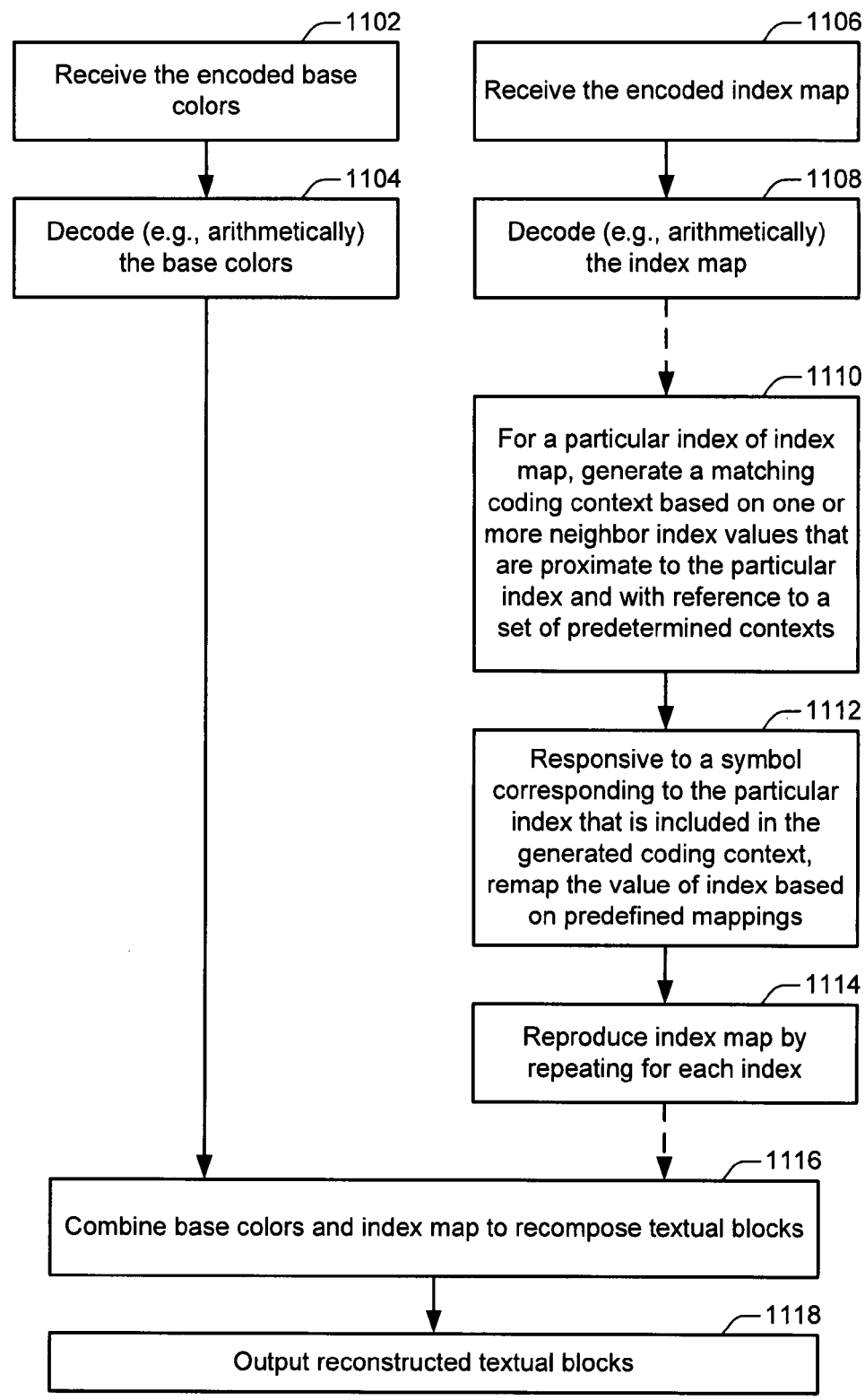
FIG. 11 is a flow diagram that illustrates an example of a method for the decoding of textual blocks.

FIG. 11 is a flow diagram 1100 that illustrates an example of a method for the decoding of textual blocks. Flow diagram 1100 includes nine (9) blocks 1102-1118. Blocks 1102-1104 pertain to decoding base colors, and blocks 1106-1114 pertain to decoding an index map. At block 1102, encoded base colors are received. At block 1104, the encoded base colors are decoded (e.g., arithmetically).

At block 1106, an encoded index map is received. At block 1108, the encoded index map is decoded (e.g., arithmetically). At block 1110, for a particular index of the decoded index map, a matching coding context is generated with reference to a set of predetermined contexts (e.g., of tabular diagram 500 of FIG. 5) and based on one or more neighbor index values that are proximate to the particular index.

At block 1112, responsive to a symbol that corresponds to the particular index and that is included in the matching coding context, the value of the particular index is remapped based on predefined index mappings (e.g., of tabular diagram 600 of FIG. 6). Each index mapping maps a symbol to a value, with the particular index corresponding to one of the symbols of the index mappings. At block 1114, the acts of blocks 1110 and 1112 are repeated for each index of the index map to reproduce the index map.

At block 1116, the decoded base colors and the decoded and remapped index map are combined to recompose the textual block(s). At block 1118, the reconstructed textual blocks are output. In the drawings, FIGS. 4, 7, 10, and 11 are flow diagrams 400, 700, 1000, and 1100, respectively. Implementations of these flow diagrams may be realized, for example, as processor-executable instructions. Processor-executable instructions may be embodied as software, firmware, hardware, fixed logic circuitry, some combination thereof, and so forth. The acts of these flow diagrams may be performed in many different environments, with a number of different devices, and/or in conjunction with a variety of different coding standards. Hence, although the descriptions of certain blocks and the acts thereof reference other elements that are described herein, they do so by way of example only. The order in which the methods are described is not intended to be construed as a limitation, and any number of the described blocks can be combined, augmented, rearranged, and/or omitted to implement a respective method, or an alternative method that is equivalent thereto.

Example Device Implementations for Textual Image Coding

Figure 12:
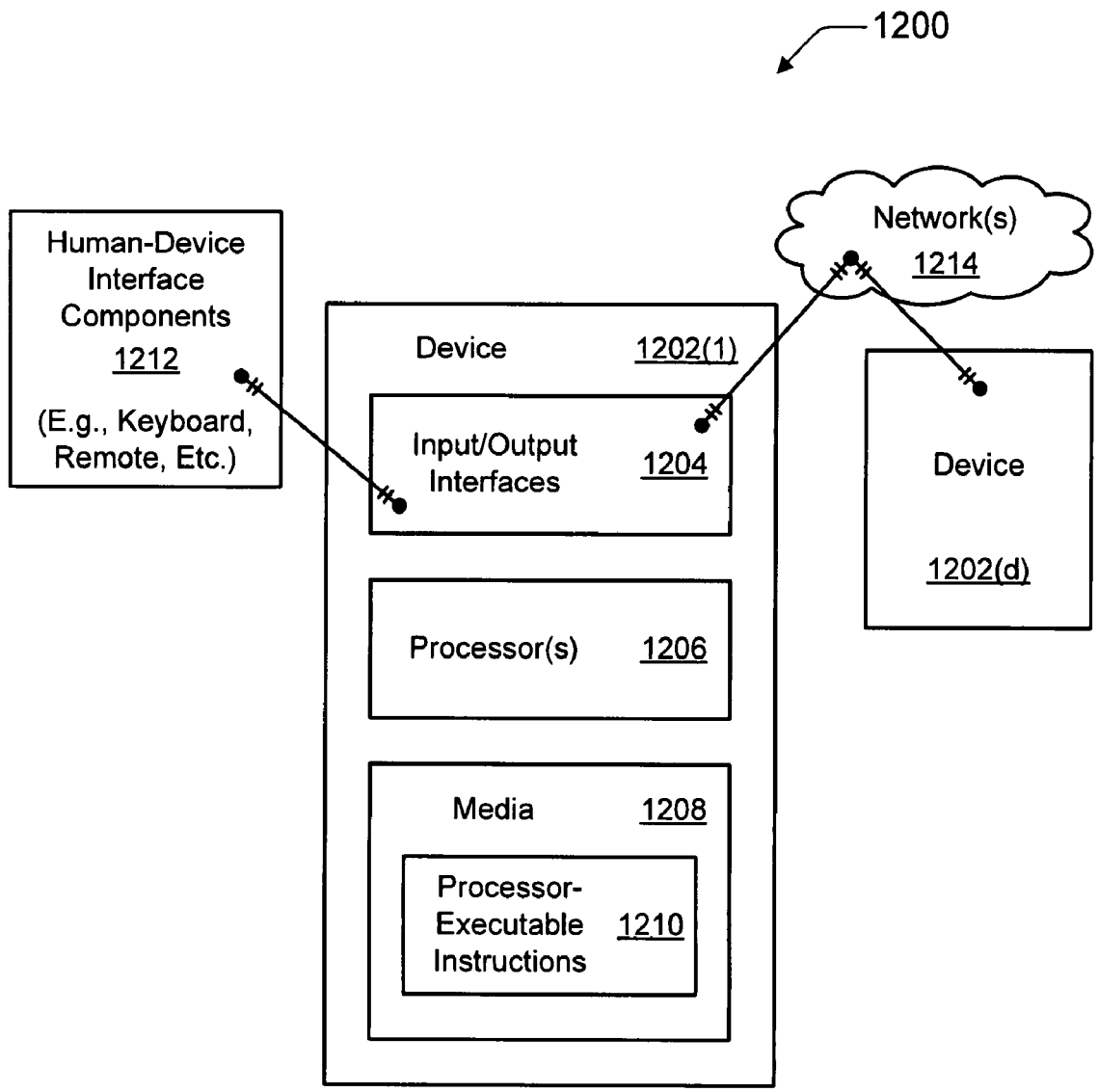
FIG. 12 is a block diagram of an example device that may be used to implement textual image coding.

FIG. 12 is a block diagram 1200 of an example device 1202 that may be used to implement textual image coding. As illustrated, two devices 1202(1) and 1202(d), with "d" representing an integer, are capable of engaging in communications via network(s) 1214. Although two devices 1202 are specifically shown, one or more than two devices 1202 may be employed, depending on implementation. Network(s) 1214 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth. Alternatively, two devices 1202 may be directly connected.

Generally, a device 1202 may represent any computer or processing-capable device, such as a server, a desktop, a notebook, etc. computer; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 1202 includes one or more input/output (I/O) interfaces 1204, at least one processor 1206, and one or more media 1208. Media 1208 include processor-executable instructions 1210.

In an example embodiment of device 1202, I/O interfaces 1204 may include (i) a network interface for communicating across network 1214, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) human-device interfaces include those that communicate by wire or wirelessly to human-device interface components 1212 (e.g., a keyboard, a remote, a mouse or other graphical pointing device, etc.).

Generally, processor 1206 is capable of executing, performing, and/or otherwise effectuating processor-executable instructions, such as processor-executable instructions 1210. Media 1208 is comprised of one or more processor-accessible media. In other words, media 1208 may include processor-executable instructions 1210 that are executable by processor 1206 to effectuate the performance of functions by device 1202. Processor-executable instructions may be embodied as software, firmware, hardware, fixed logic circuitry, some combination thereof, and so forth.

Thus, realizations for textual image coding may be described in the general context of processor-executable instructions. Generally, processor-executable instructions include routines, programs, applications, coding, modules, protocols, objects, components, metadata and definitions thereof, image data structures, context and mapping-oriented data structures, other data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1206 may be implemented using any applicable processing-capable technology, and one may be realized as a general purpose processor (e.g., a central processing unit (CPU), a microprocessor, a controller, etc.), a graphics processing unit (GPU), a dedicated or special-purpose processor, a derivative thereof, and so forth. Media 1208 may be any available media that is included as part of and/or accessible by device 1202. It includes volatile and non-volatile media, removable and non-removable media, storage and transmission media (e.g., wireless or wired communication channels), hard-coded logic media, combinations thereof, and so forth. Media 1208 is tangible media when it is embodied as a manufacture and/or as a composition of matter. For example, media 1208 may include an array of disks or flash memory for longer-term mass storage of processor-executable instructions 1210, random access memory (RAM) for shorter-term storing of instructions that are currently being executed and/or otherwise processed, link(s) on network 1214 for transmitting communications, and so forth.

As specifically illustrated, media 1208 comprises at least processor-executable instructions 1210. Generally, processor-executable instructions 1210, when executed by processor 1206, enable device 1202 to perform the various functions described herein. Such functions include, but are not limited to: (i) those acts that are illustrated in flow diagrams 400, 700, 1000, and 1100 (of FIGS. 4, 7, 10, and 11, respectively); (ii) those that are illustrated in the different described procedures, scenarios, etc. of FIGS. 1-3; (iii) those that are realized by the encoder 800 and decoder 900 of FIGS. 8 and 9, respectively; (iv) those involving the contexts 502 and mappings 602 of FIGS. 5 and 6, respectively; those of other algorithms described herein; combinations thereof; and so forth.

The devices, acts, aspects, features, functions, procedures, modules, data structures, techniques, components, etc. of FIGS. 1-12 are illustrated in diagrams that are divided into multiple blocks and other elements. However, the order, interconnections, interrelationships, layout, etc. in which FIGS. 1-12 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for textual image coding.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claimed invention.

What is claimed is:

1. One or more processor-accessible tangible media comprising processor-executable instructions that, when executed, direct a device to perform acts comprising:
   identifying textual blocks from among multiple blocks of an image; and
   compressing the textual blocks by implementing the following acts for each textual block:
      decomposing the textual block into base colors and an index map, the index map having multiple index values that each reference a base color to represent at least part of a textual block;
      converting the index map by implementing the following acts for at least a portion of the multiple index values of the index map:
         generating a coding context that matches the index value based on one or more other index values of the index map that are proximate to the index value and with reference to a set of predetermined contexts; and
         remapping the index value responsive to a symbol that corresponds to the index value and that is included in the matching coding context; and
      encoding the converted index map to produce a compressed index map.

2. The one or more processor-accessible media as recited in claim 1, wherein the act of compressing further comprises acts of:
   encoding the base colors of each textual block;
   transmitting the encoded base colors and the compressed index map as part of a bit stream.

3. The one or more processor-accessible media as recited in claim 2, comprising the processor-executable instructions that, when executed, direct the device to perform further acts comprising:
   identifying graphical blocks from among the multiple blocks of the image;
   encoding the graphical blocks using a predetermined image compression algorithm; and
   transmitting the encoded graphical blocks as part of the bit stream.

4. The one or more processor-accessible media as recited in claim 3, wherein the predetermined image compression algorithm comports with an H.264/Advanced Video Coding (H.264/AVC) standard.

5. The one or more processor-accessible media as recited in claim 1, wherein:
   the matching coding context comprises multiple symbols;
   the act of generating comprises establishing an index value-to-symbol correspondence for each index value of the one or more other index values based on the matching coding context; and
   the act of remapping comprises (i) determining the symbol that corresponds to the index value using the established index value-to-symbol correspondences and (ii) replacing the index value with a mapped index value from an index mapping that maps the symbol that corresponds to the index value to the mapped index value.

6. One or more processor-accessible tangible media comprising processor-executable instructions that, when executed, direct a device to perform acts comprising:
ascertaining a set of neighbor index values for a particular index of an index map, the index map having index values that each reference a base color of multiple base colors so as to represent at least part of a textual block;
generating a context from among multiple predetermined contexts that matches the set of neighbor index values, the matching context comprising a set of symbols;
determining at least one symbol-to-value mapping based on the matching context and a symbol to which the particular index corresponds, the symbol-to-value mapping including at least one mapping from a respective symbol to a respective value; and
remapping the particular index to a particular value in accordance with the symbol-to-value mapping and the symbol to which the particular index corresponds.

7. The one or more processor-accessible media as recited in claim 6, comprising the processor-executable instructions that, when executed, direct the device to perform further acts comprising:
decomposing the textual block into the multiple base colors and the index map;
repeating the acts of ascertaining, generating, determining, and remapping for each index value of the index map to produce a converted index map; and
encoding the converted index map to compress a size of the converted index map.

8. The one or more processor-accessible media as recited in claim 6, comprising the processor-executable instructions that, when executed, direct the device to perform further acts comprising:
decoding the multiple base colors;
decoding the index map;
repeating the acts of ascertaining, generating, determining, and remapping for each index value of the index map to produce a remapped index map; and
combining the multiple base colors and the remapped index map to recompose the textual block.

9. The one or more processor-accessible media as recited in claim 6, wherein each of the multiple predetermined contexts comprises four symbols of one or more symbol types, each respective symbol type to correspond to a respective base color as established by the set of neighbor index values.

10. The one or more processor-accessible media as recited in claim 9, wherein the multiple predetermined contexts include: at least one that has four identical neighboring color indices, at least one that has exactly three identical neighboring color indices, at least one that has two pairs of identical neighboring color indices, at least one that has exactly two identical neighboring color indices, and at least one that has no identical neighboring color indices.

11. The one or more processor-accessible media as recited in claim 9, wherein the set of neighbor index values comprise index values that are adjacent to the particular index.

12. The one or more processor-accessible media as recited in claim 6, wherein each of the multiple predetermined contexts comprises four symbols, two symbols of which are along at least one cardinal direction with respect to the particular index and two symbols of which are along at least one diagonal direction with respect to the particular index.

13. The one or more processor-accessible media as recited in claim 12, wherein the four symbols comprise a left symbol, a top-left symbol, a top symbol, and a top-right symbol; the left, top-left, top, and top-right being defined with respect to the particular index.

14. The one or more processor-accessible media as recited in claim 6, comprising the processor-executable instructions that, when executed, direct the device to perform further acts comprising:
quantizing colors of the textual block to reduce an entropy level of the textual block; and
after the act of quantizing, decomposing the textual block into the multiple base colors and the index map.

15. The one or more processor-accessible media as recited in claim 14, wherein the act of quantizing comprises an act of:
clustering neighboring similar pixels into groups to perform a quantization on a local level.

16. The one or more processor-accessible media as recited in claim 15, wherein the act of quantizing further comprises an act of:
quantizing pixels in each group to one of the multiple base colors.

17. The one or more processor-accessible media as recited in claim 16, wherein the act of quantizing further comprises an act of:
Limiting a total number of the multiple base colors in dependence on the content of the textual block by setting an allowed maximum distortion to a constant.

18. A device comprising:
a demultiplexer to accept a textual bit stream having at least one textual block and to output base colors and an index map having multiple coded index values, the base colors and the index map representing the textual block;
a context-adaptive decoder to accept the index map from the demultiplexer and to decode the index map to produce multiple index values and decoded pixels;
a context generator and an index remapper that has access to neighboring decoded pixels for each particular index value of the textual block; the context generator to generate a context from among multiple predetermined contexts that matches the neighboring decoded pixels, the matching context comprising a set of symbols; the index remapper to determine at least one symbol-to-value mapping based on the matching context, the symbol-to-value mapping including a mapping from a respective symbol to a respective value; the index remapper further to remap a particular index value to a particular value in accordance with which symbol of the symbol-to-value mapping corresponds to the particular index value; the context generator and the index remapper to output the particular value for the particular index value; and
wherein the context-adaptive decoder is to accept the particular value from the context generator and the index remapper as a decoded pixel for the particular index value.

19. The device as recited in claim 18, further comprising:
a decoder to accept the base colors from the demultiplexer and to decode the base colors to produce decoded base colors; and
a recomposer to accept the decoded base colors from the decoder and the decoded pixels from the context-adaptive decoder, the recomposer to combine the decoded base colors and the decoded pixels to recompose the textual block to produce a reconstructed textual block.

20. The device as recited in claim 19, further comprising:
another demultiplexer to receive a combined bit stream and to output the textual bit stream having the at least one textual block and a graphical bit stream having at least one graphical block;
an entropy decoder to accept the graphical bit stream from the other demultiplexer and to decode the graphical block to produce a decoded graphical block;

a dequantizer to dequantize the decoded graphical block to produce a dequantized graphical block;

an inverse transformer to transform the dequantized graphical block to produce a reconstructed graphical block; and a reconstructor to reconstruct at least part of a compound image from the reconstructed textual block and the reconstructed graphical block.

* * * * *